US010622892B2

United States Patent
Leong (10) Patent No.: US 10,622,892 B2
(45) Date of Patent: Apr. 14, 2020

(54) FREQUENCY DETECTION TO PERFORM ADAPTIVE PEAK CURRENT CONTROL

(71) Applicant: STMicroelectronics Asia Pacific Pte Ltd, Singapore (SG)

(72) Inventor: Kong Yin Leong, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/405,861

(22) Filed: May 7, 2019

(65) Prior Publication Data

US 2019/0267899 A1    Aug. 29, 2019

Related U.S. Application Data

(63) Continuation of application No. 16/004,253, filed on Jun. 8, 2018, now Pat. No. 10,326,367, which is a continuation of application No. 15/382,482, filed on Dec. 16, 2016, now Pat. No. 10,008,933.

(51) Int. Cl.
| | |
|---|---|
| H02M 3/158 | (2006.01) |
| H02M 3/156 | (2006.01) |
| H02M 1/088 | (2006.01) |
| H02M 1/00 | (2006.01) |

(52) U.S. Cl.
CPC .......... *H02M 3/158* (2013.01); *H02M 1/088* (2013.01); *H02M 3/156* (2013.01); *H02M 2001/0009* (2013.01); *H02M 2001/0019* (2013.01)

(58) Field of Classification Search
CPC ...... H02M 3/158; H02M 1/088; H02M 3/156; H02M 2001/0019
See application file for complete search history.

(56) References Cited

U.S. PATENT DOCUMENTS

| | | | |
|---|---|---|---|
| 4,698,554 A | 10/1987 | Stupp et al. | |
| 6,215,288 B1 | 4/2001 | Ramsey et al. | |
| 8,742,745 B2 | 6/2014 | Huang | |
| 9,614,438 B2* | 4/2017 | Davis | H02M 3/156 |
| 9,632,120 B2 | 4/2017 | Lim et al. | |
| 2008/0067993 A1* | 3/2008 | Coleman | H02M 1/15 323/282 |

(Continued)

FOREIGN PATENT DOCUMENTS

| | | |
|---|---|---|
| CN | 103368360 A | 10/2013 |
| CN | 104201883 A | 12/2014 |

(Continued)

*Primary Examiner* — Emily P Pham
(74) *Attorney, Agent, or Firm* — Seed IP Law Group LLP (57) ABSTRACT

The amount of power being output to the load is sensed by sampling the frequency of the pulse width modulation signal that is controlling the switch that is providing the power to the load. If the pulse width modulation signal has a high frequency, then it will be providing higher power to the load. As the power drawn by the load decreases, the frequency of the pulse width modulation power supply signal will decrease. By sensing and periodically sampling the frequency of the pulse width modulation signal that is providing power, the demand of the load can be quickly and accurately determined. As the power demand of the load decreases, the peak current that the power supply switch can provide also decreases. The permitted peak current dynamically changes to adapt to the power drawn by the load.

20 Claims, 8 Drawing Sheets

(56) References Cited

U.S. PATENT DOCUMENTS

| | | |
|---|---|---|
| 2008/0174286 A1 | 7/2008 | Chu et al. |
| 2010/0320986 A1 | 12/2010 | Collins |
| 2014/0117960 A1 | 5/2014 | Boling |
| 2014/0268920 A1 | 9/2014 | Fang et al. |
| 2015/0280556 A1* | 10/2015 | Bari .................... H02M 3/156 323/282 |
| 2017/0288554 A1* | 10/2017 | Fahlenkamp ........... H02M 1/08 |

FOREIGN PATENT DOCUMENTS

| | | |
|---|---|---|
| CN | 104617774 A | 5/2015 |
| CN | 104852579 A | 8/2015 |

\* cited by examiner

FREQUENCY DETECTION TO PERFORM ADAPTIVE PEAK CURRENT CONTROL

This application is a continuation of and claims priority from U.S. application Ser. No. 16/004,253, filed on Jun. 8, 2018, now pending, which is a continuation of U.S. application Ser. No. 15/382,482, filed on Dec. 16, 2016, now issued, the entirety of which is enclosed herein by reference.

BACKGROUND

Technical Field

This invention is in the field of switching regulators and, in particular, a circuit which adaptively controls, to varying levels, the maximum current that can be supplied from the regulator.

Description of the Related Art

Inductive DC-DC switching power supply regulators are known in the art to be efficient power stage converters to provide different voltages within a system. Such a DC-DC switching regulator uses an external inductor as a storage device to transform a voltage level from one voltage to another or, transition from a voltage-based power output to a current-based power output. There are many types of switching regulators, ranging from buck regulators, buck-boost regulators, boost regulators, and the like. These may operate in either continuous or discontinuous mode. Some of these regulators have a fixed frequency, while others have a variable frequency that can depend on the application and the external components that can be selected. One of the issues that must be addressed in a DC-DC switching regulator is the power ratings of the components to be used in the circuit. In particular, if a component, such as a transistor, inductor, or the like has a high current rating, it will generally be more robust, but will also be larger, significantly more expensive, and take up more space in the circuit. On the other hand, if components can be used with lower power ratings, particularly a lower current rating, then the circuit can be made at a lower cost, as well as consume less space in the integrated circuit and will generally be more compact. It is important to ensure that the current of a system does not exceed the rating of the components used therein. As can be appreciated, if components, such as transistors and inductors having a low current rating, are subjected to a current that exceeds their ratings they may be harmed, or even destroyed, thus preventing proper operation of the circuit.

BRIEF SUMMARY

According to principles of the various embodiments discussed herein, a new technique is proposed to managing and controlling the peak current that will be output by a power supply. An entire new technique for sensing the power drawn by the load and varying the peak amount of current that will be permitted is introduced. In particular, the amount of power being output to the load is sensed by sampling the frequency of the pulse width modulation signal that is controlling the switch that is providing the power to the load. If the pulse width modulation signal has a high frequency, then it will be providing higher power to the load. As the power drawn by the load decreases, the frequency of the pulse width modulation power supply signal will decrease. By sensing and periodically sampling the frequency of the pulse width modulation signal that is providing power, the demand of the load can be quickly and accurately determined.

A circuit which makes use of sampling the output frequency of a variable frequency mode switching regulator permits the use of the circuit in which the peak current that is permitted by the system can be adjusted adaptively. Namely, the peak current that the circuit is permitted to output can vary, depending on the power being drawn by the load, to adaptively provide the most efficient operating frequency. This will improve dynamic transient load responses, provide a higher efficiency of operation, as well as generally resulting in a higher operating frequency for the output of the power to the load. Using such an adaptive, dynamically variable peak current regulator, the maximum peak current that can be reached by the system can be limited to an overall lower current and further, the amount of time that the circuit operates in a low current mode will be increased. This will permit the use of smaller components, such as a smaller inductor, and transistors which can have a lower current rating. Such a circuit will save costs in the construction and have a lower overall power dissipation for the switching regulator as it provides power to the load.

According to one embodiment, the frequency of the pulse width modulation signal that drives the power switch circuit is sensed on a regular basis. The frequency is converted to a voltage having a level corresponding to the frequency, the higher the voltage, the higher the frequency. The voltage is input to a peak current detection circuit which will detect the peak current that the components in the power supply circuit will be subjected to as power is supplied to the load.

The proposed solution makes use of the variable frequency based on the variable demands on the power supply by the load to vary the current that is permitted as the peak current. This operation will now be summarized.

As the load draws less power, the frequency will be reduced by the feedback system of the regulator. The circuit will sense the power drawn by the output load by detecting the frequency of the pulse width modulation signal that drives the gate of the power switch circuit that provides power to the load. An analog circuit is used to integrate the pulse width modulation signal using a capacitor charging through a switch to reset and discharge through a current source to determine the integrated voltage of that particular frequency which is being output. The duty cycles of the different output voltages will vary.

The output of the following slope of the PWM power signal is sampled and held at a capacitor. When the frequency is high, the voltage which is held in the capacitor will be higher and, when the operating frequency is low, the voltage at the capacitor will be lower. A bias current is generated using a current generator that is based on the voltage at the hold capacitor. The current generated will be proportional to the voltage at the hold capacitor.

The power transistor and mirrored sensing transistor are used to detect the current limit. The sensing transistor has a mirrored ratio k with respect to the power transistor. When the bias current increases, the mirror current increases. The voltage will start to fall. When the frequency is low, meaning low power is being drawn by the load, the hold voltage will also fall. However, the output voltage of the sensing stage will be clamped at a certain threshold. This threshold will determine the minimum peak current at which the device will operate. This peak current will vary dynamically over the operation of the circuit. Namely, when high power is being drawn, the permitted peak current will increase. On the other hand, when low power is being drawn, such as when the circuit is being put in sleep mode, the system will dynamically adapt to reduce the peak current that the regulator is permitted to put out. In such a circumstance, during low power modes, the circuit will prohibit the output current from reaching above a selected value. This selected level will be lower than the permitted peak current when the load is drawing high power. If the power drawn by the load increases, then the permitted peak current output by the system will dynamically change to increase.

Using this method of controlling the switching voltage regulator, there is no need to sense the output voltage in order to determine the bias current that is needed or if the peak current is being approached. The circuit response to transients, such as high or low power conditions will be very fast, resulting in low ripples in the power supply output. The operating frequency of the PWM output system will, therefore, be much faster and usually higher than under prior art systems. Accordingly, in the present system there is a tracking timer that is used to reset the integrator. When the operating period is longer than the timer period, the hold capacitor is reset. This will significantly improve the output recovery from a maximum load a light load condition by resetting the current limit to a new minimum as the power drawn by the load is varied. This permits the maximum peak current that the system may experience at any one time to be limited to different values which are dynamically changed based on the amount of power drawn by the load. In addition, there will be a minimum value that the peak current can be limited to in order to ensure continued operation, even during very low power draw situations.

DETAILED DESCRIPTION

Figure 1:
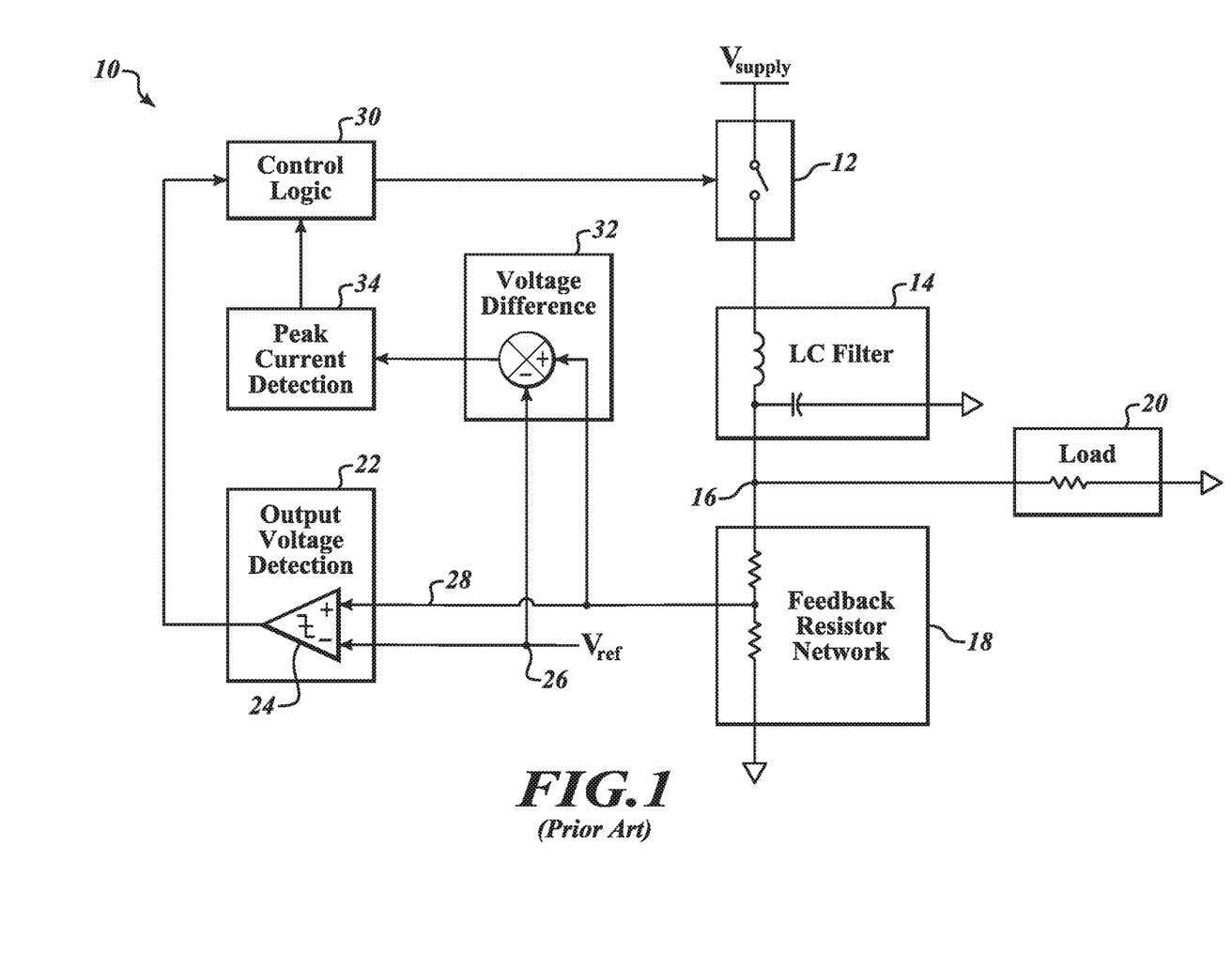
FIG. 1 is a block diagram of a DC-DC switching power regulator of a type known in the art.

FIG. 1 illustrates a DC-DC switching regulator 10 of a type known in the prior art. As can be seen in this prior art circuit, a power switch 12 provides input power to drive a load 20. The power provided through the power switch 12 passes through an LC filter 14 before being available to the load. The load is connected to node 16 to receive the power that is output from the LC filter 14. A feedback resistor network 18 is coupled to node 16 in order to sense the amount of power drawn by the load. In this particular prior art system 10, the feedback resistor network 18 provides one input to an output detection circuit 22. In this particular output detection circuit 22, a comparator 24 is provided which receives a reference voltage 26 on the inverting input and the feedback voltage 28 on the noninverting input.

The output of the output detection voltage detection stage 22 is provided to the control logic 30 which controls the switching of the power supply switch 12. If the output voltage detection circuit indicates the voltage at node 16 is too low, the control logic 30, based on the input signal from the output voltage detection circuit 22 will close the power switch 12 to provide additional power to the load 20. On the other hand, if the load 20 has sufficient power, the control logic will output a signal to open the switch 12 and reduce the amount of power being provided to the load 20.

Another part of the control of the prior art DC switching regulator 10 is to limit the amount of current that can be provided via the switching circuit 12. In particular, if the load has a high demand for additional power, the power switch 12 may permit an extremely large current to flow to try to meet the demand for additional power. In some circumstances, the load or other components in the system may have components which are sensitive to a very high current. Therefore, in order to reduce the chance for damage to these components, it is desirable to limit the amount of current that can flow through the power switch 12 to be provided to the load to a permitted peak current.

In the prior art, the voltage difference circuit 32 senses the additional power being requested by the load 20, and sends a signal to the peak current detection circuit 34 to indicate the additional power being requested. In the prior art, the switching regulator 10 will have a preset maximum current that will be permitted as the peak current. For example, the switching regulator may be designed and set to permit a maximum of 2 amps to be provided to the load from the power switch 12 to the node 16. In the event the amount of current to be provided exceeds 2 amps, the peak current detection circuit 34 will sense that the current is about to exceed 2 amps, and will send a signal to the control logic 30 to prevent providing additional power. Therefore, when the peak current detection circuit 34 detects that the current output is approaching the permitted peak current, it will output a signal to the control logic 30 to override the request for additional power and cause the power switch 12 to open. This will prevent excessive current from being provided via the switch 12 that might exceed the previously established peak current that will be permitted by the system.

Such a system of the type shown in FIG. 1 is beneficial to provide sufficient power to the load 20 while at the same time protecting components in the system from being damaged by an amount that has been established as a peak current that will be permitted in the system. As can be appreciated, it is often desired to have the peak current at a relatively high value to ensure that sufficient power can be provided to the load 20 when there is a demand for high power. Unfortunately, if the peak current is set at a high value, for example, 2 amps, then it may be necessary to ensure that all of the components in the system can withstand 2 amps without being destroyed. Accordingly, any components in the LC filter 14, as well as other components in the system attached to node 16, as well as components in the load 20, must be selected to withstand a possible current of 2 amps. One drawback of requiring components to withstand a relatively high current is that they are more expensive, thus driving up the cost of the system. In addition, high power components frequently take up more area, whether on a semiconductor chip or as a standalone component. Accordingly, in order to have lower-cost components and to reduce the size of the components, it is preferred to have a lower peak current.

Under circuit operation of the prior art, the power transistor circuit 12 will turn on until a maximum current is reaches, which is the peak current limit that has been set by the system. The control logic 30 will thereafter turn off the switch 12 and wait until the current has reduced below the maximum amount, for example to permit the current through the inductor in the LC filter 14 to recirculate or to fully reach zero. After the current has reduced below the desired limit, the control logic 30 will enable switch 12 to provide power once again to the system. The cycle will continue until the target voltage has been reached, and will be maintained as necessary to maintain the target voltage at node 16. In this operation, when the power demand of load 20 is very high, such as during startup of the system, the peak current will be hit frequently, and therefore the system will be frequently turned off because the peak current is repeatedly reached. In such a system, the peak current will likely be established at a very high value to provide for fewer turn-off events and to ensure that the desired voltage at node 16 is easily reached. Therefore, the architecture provided at FIG. 1 will be costly because of the higher rating that will be required of the inductor in the LC filter 14, as well as the higher current rating that other system components must accept, such as transistors, capacitors, and other components. In addition, the power loss will be greater due to the higher current, both through heating and parasitic dissipation.

Figure 2:
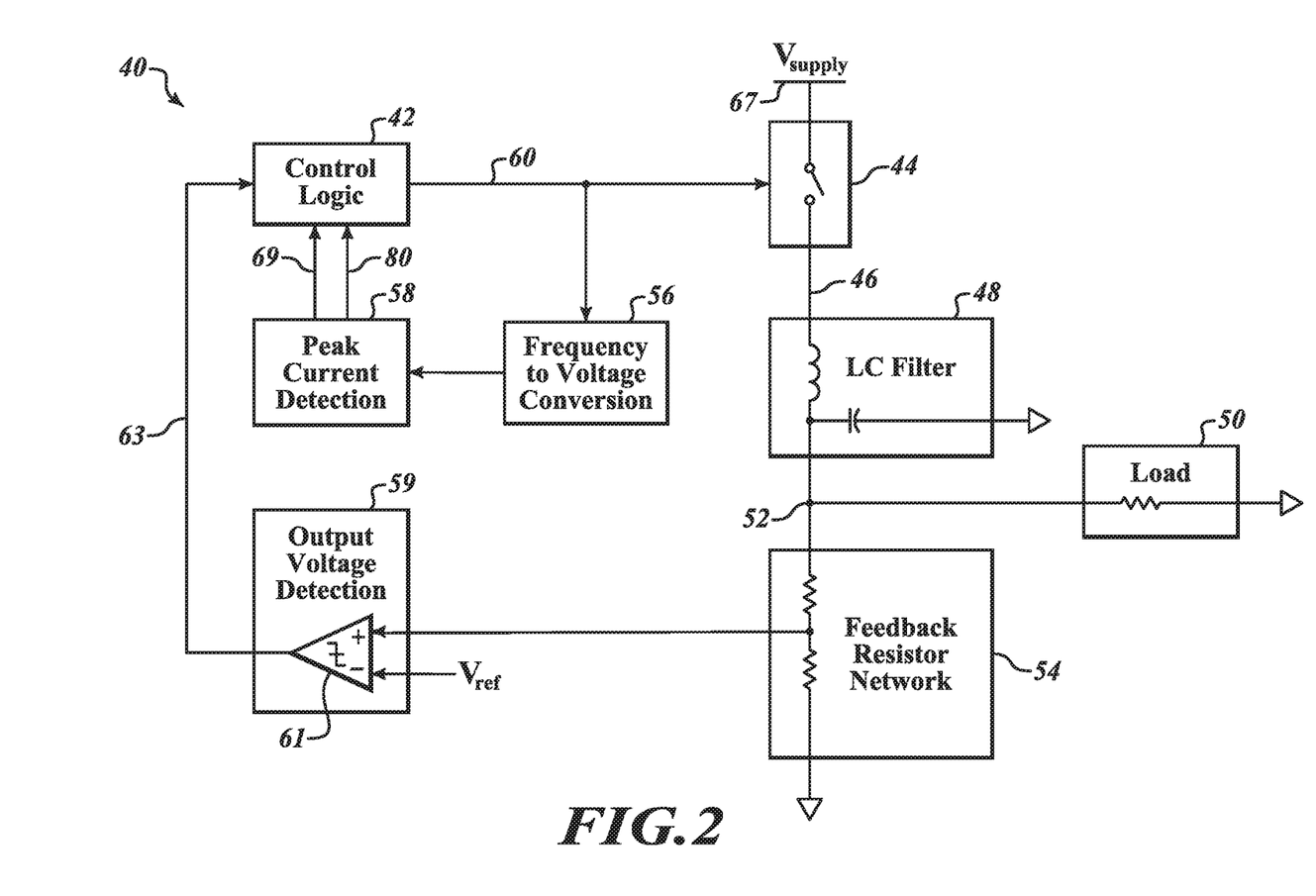
FIG. 2 is a block diagram of a DC-DC switching power regulator according to principles of the embodiments disclosed herein.

FIG. 2 shows an inventive DC-DC switching regulator circuit 40 according to principles disclosed herein. In the inventive DC-DC switching regulator 40, control logic 42 outputs a signal to a power supply switch circuit 44. The power supply switch circuit 44 can be any acceptable power supply switching system. In some embodiments, it may be a single power transistor; in other embodiments it may be a circuit including output buffers, power drive circuits, amplifiers, or other components. It may, in some circumstances, be a complete and complex power supply circuit which includes a number of transistors which cooperate to provide an output power to a load, even though it may be shown as a single switch for ease of illustration.

The output of the power supply is provided on node line 46 to an LC filter 48. The LC filter 48 may be any one of a different variety of filters. In the example shown of the LC filter 48, the inductor is in series with the current being provided to the load; however, other embodiments of the filter 48 may be provided including a filter which may include only capacitors and no inductors, or only inductors and resistors. The output of the filter 48 is provided to a power supply node 52. The power supply node 52 provides to the load 50 so that the load may operate.

The load 50 may be any acceptable load, such as a microprocessor, a display driver, a graphics processor, a motor, such as the type used to rotate a hard disk drive, move a voice coil motor, drive a MEMS or other load of the type commonly used in electronic circuits. In most instances, the load 50 will be a semiconductor chip, although in some instances the load 50 may include an electromechanical component, such as a solenoid, a motor, or the like.

A feedback resistor network 54 is also coupled to the power output node 52. The output voltage detection circuit 22 functions in a manner similar to that shown in the prior art system 10 by indicating to the control logic 42 whether additional power is needed to be provided at the power output node 52.

The inventive system of FIG. 2 includes a frequency-to-voltage conversion circuit 56 and an adaptive peak current detection circuit 58. When the current demand by the load 50 will exceed the peak current, the peak current detection circuit sends a control signal on line 80 to the control logic 42 to reduce the amount of current provided through the power supply switch circuit 44 to the load 50. The value of this permitted peak current will change to be higher or lower, depending on the load demands. In this way the permitted peak current will dynamically vary and adaptively change during the operating time of the regulator that is providing power to the load 50. In addition, a separate, backup current limit is also provided on line 69. If the current limit set by line 69 is approached, which is a non-changing, static current limit, then the control circuit 42 will also reduce the power to the load. The peak current detection circuit 58 can therefore output two signals that will reduce the current provided by the power supply switch circuit 44 to the load at node 52. A first signal on line 80, which will be output based on a dynamic threshold that changes adaptively based on current drawn by the load and a second signal on line 69 which will be a static threshold that will be reached if the current reaches a different, preset value.

The DC-DC switch regulator of the type shown in FIG. 2 is one in which the output signal from control logic 42 provided on line 60 is a pulse-width modulated frequency signal, commonly known as a PWM signal. In this type of system, a PWM signal is provided whose frequency changes depending on the amount of power to be provided to the power output node 52. The signal output on line 60 is a variable frequency PWM control signal. As the frequency increases, the amount of power provided through the power supply switch circuit 44 will increase. As the frequency output on line 60 goes down, the amount of power provided out of the power supply switch circuit 44 will decrease. The frequency of the signal on line 60 will be driven based on the signal received by the output voltage detection circuit 59 that is input on line 63 to the control logic 42.

The value of the current that will be permitted as the peak current by the system 58 is variable, depending on the frequency of the signal output on line 60. In particular, in the inventive variable frequency voltage mode switching regulator 40, the value of the permitted peak current will be adjusted dynamically to provide the best efficient operating frequency to improve the power provided in response to changes in the load demand. This will also provide higher efficiency and permit a higher operating frequency than was permitted previously. Using this system, the current that is permitted as the peak current will be lower during high power operation. Further, the current that will be permitted as the peak current will vary, depending on the demand for power from the load. As the power demanded is decreased, the current that will be set as the maximum allowable peak current will be decreased. This will provide a lower peak current limit for the circuit, and thus permit use of smaller components, such as a smaller inductor, which will save cost, reduce power dissipation in operation, and also take up less space. The use of the smaller inductor provides the significant benefit of reducing the power dissipation that is lost in the inductor.

In the switching regulator circuit as shown in FIG. 2, when the power drawn by the load increases, the frequency of the PWM signal output on line 60 will also increase. This provides more power from the power supply 67 to the load 50. When the power drawn by the load 50 decreases, the operating frequency will also reduce correspondingly. According to the principles of this disclosure, the system takes advantage of this variation in the frequency as the power in the load varies to also vary the permitted peak current. The frequency sensor 56 will first sense changes in the power provided to the load 50 by detecting the frequency of the PWM signal provided on line 60. An analog integrator circuit within the frequency-to-voltage conversion 56 will integrate the PWM pulse using a capacitor charging through a switch to reset and discharge through a current source to create a voltage that is proportional to a particular frequency as sensed on line 60. Even though the duty cycle for different output voltages will vary, a divide-by-two counter is provided to process the PWM duty cycle to exactly 50%. This will ensure that the discharging period is always linear with respect to the frequency for the particular capacitor.

Figure 4:
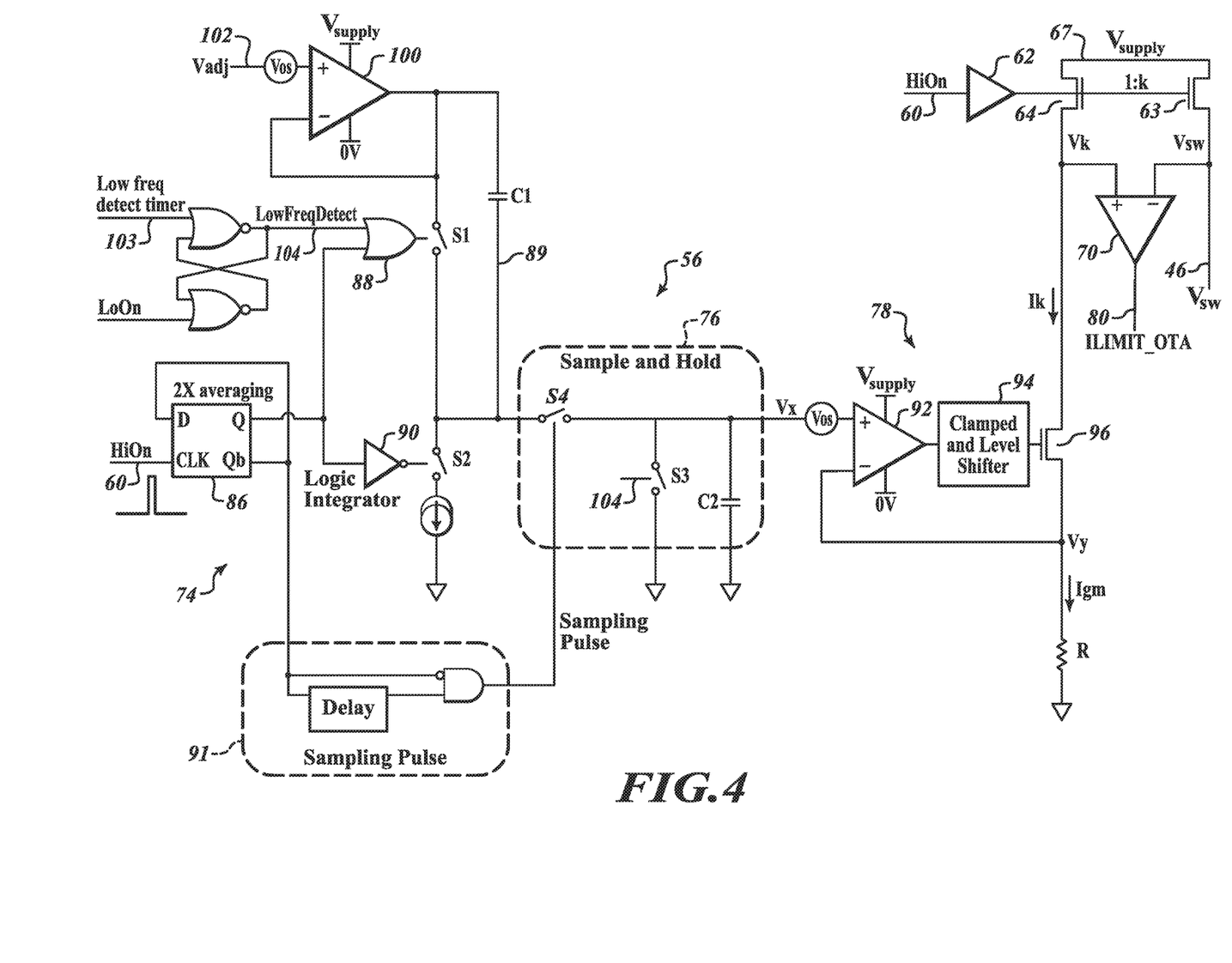
FIG. 4 is a detailed circuit diagram of selected portions of the circuit as shown in FIG. 3 to more clearly illustrate operation of the embodiments as disclosed herein.

The output of the falling slope of the PWM signal will be sampled and held at a capacitor, C2 (see FIG. 4). When the frequency is high, the voltage held at C2 will be higher. Similarly, when the frequency is low, the voltage held at the capacitor C2 will be lower. A bias current $I_{gm}$ is generated using a bias current generator that will vary based on the voltage at the hold capacitor C2. The current $I_{gm}$ which is generated will be equal to the hold voltage Vx×Gm.

This system will now be described with respect to FIGS. 3 and 4.

Viewing FIGS. 3 and 4 together, one example of specific circuits for the frequency-to-voltage conversion 56 and the peak current detection 58 are shown, together with one embodiment of the power supply switch circuit 44 and some portions of the control logic 42, as will now be explained. The PWM output on line 60 of FIG. 2 is shown in FIGS. 3 and 4 with the reference number 60, also using the name HiOn. This line 60 is provided as an input to the power supply switch circuit 44. In the example shown in FIG. 3, the power supply switch circuit 44 includes a drive buffer 62 and a single power transistor 63. In one embodiment, the drive buffer 62 is a high power, double stage driver. As previously mentioned, the power supply switch circuit 44 may contain a number of components, although in its simplest form, the main switching component is a power transistor 63. When power transistor 63 is turned on, the power is provided from the $V_{supply}$ 67 to the node labeled $V_{SW}$. This is the node to which the LC filter 48 is connected. In the example shown in FIG. 3, the voltage supply is a negative voltage supply, since that is the type used in one embodiment for driving the hard disk as the load 50. In other embodiments, it may be a positive voltage supply, or any other voltage supply desired provided at the voltage supply 67. The transistor 84 is normally on and will provide the power from node $V_{SW}$ to the power output node 52, VNEG. The output node 52 provides power to load 50. One preferred use of this system 40 is to provide the power to a hard disk. This power supply 40 may drive any load 50, such as a voice coil motor, the rotating motor to spin the hard disk, and other components of the hard disk drive.

Figure 3:
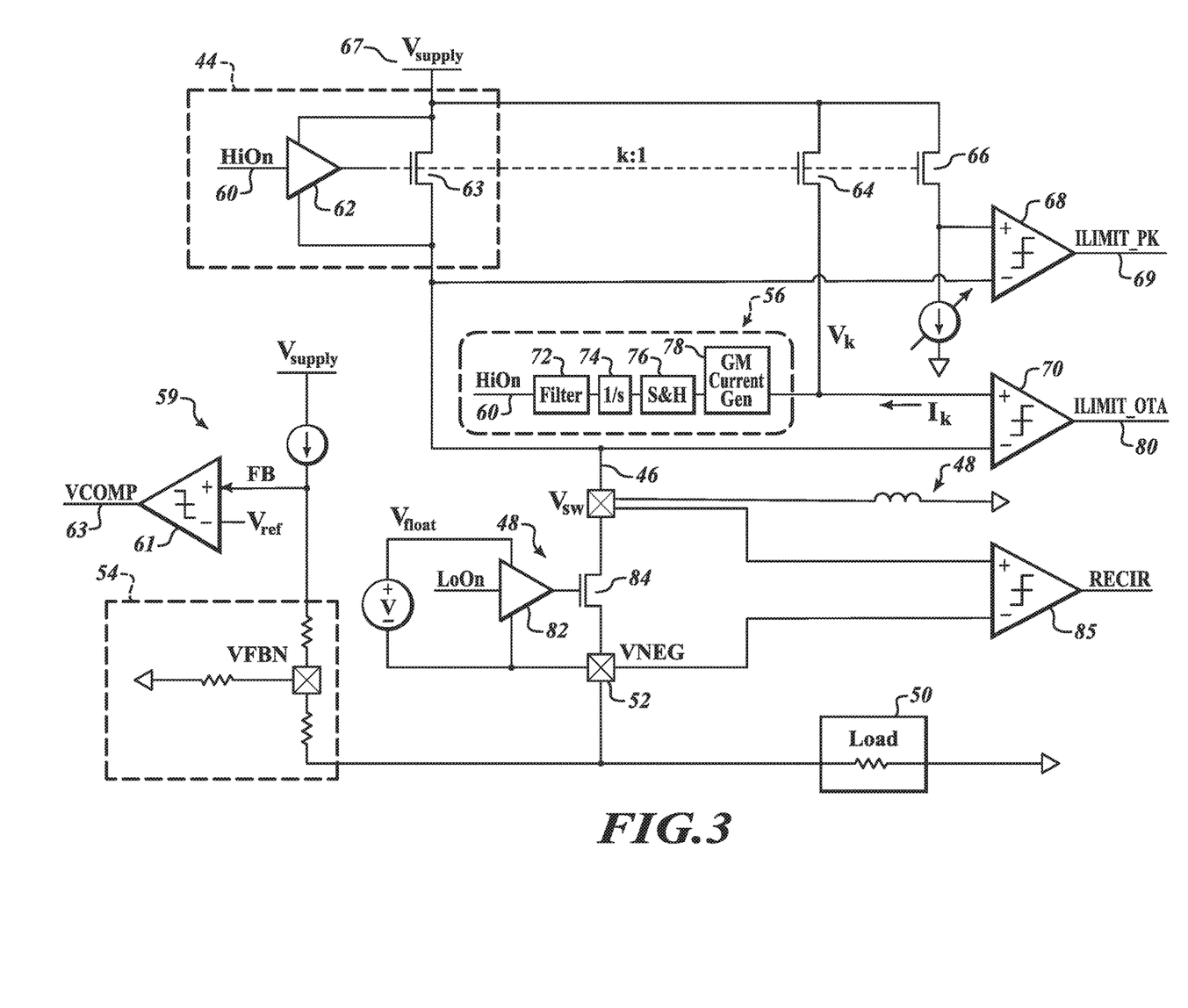
FIG. 3 is a detailed circuit diagram of the control logic and peak current detection from the block diagram of FIG. 2.

As can be seen viewing FIG. 3, at the same time the PWM signal is provided on line 60 to drive the power transistor 63, it is also provided as an input to the frequency-to-voltage conversion 56, which is shown generally, in simplified form, in FIG. 3 and in more detail in FIG. 4. Referring to FIG. 3, the output on the line 60 is provided to the frequency-to-voltage conversion circuit 56, which provides for adaptive peak current control using the frequency detection. In particular, the frequency-to-voltage converter 56 includes a filter 72, a frequency integrator 74, a sample and hold circuit 76, and a current generator 78 that generates a bias current $I_{gm}$. The output of this frequency detect circuit 56 is provided to one input of comparator 70. Transistor 64 is a current mirror circuit that provides signal $V_k$ on into the frequency conversion circuit 56 as a mirror signal at a ratio of k:1 from the power transistor 63. The comparator 70 receives as its other input the voltage output from the power transistor 63 at node 46. The comparator 70 outputs a signal to limit the peak current, labeled ilimit_OTA on line 80.

The power passes through a filter 48 that is coupled to node 46 and is provided through the filter to the output node 52, labeled in FIG. 3 as VNEG. This is the node to which the load 50 is coupled, as can be seen in FIGS. 2 and 3.

In one embodiment, the filter 48 may include a drive buffer 82 and a transistor 84, with the inductor coupled in a type of parallel arrangement. This is just one possible embodiment of the filter 48, and other embodiments may be used, such as one in which the filter 48 is an LC filter with the inductor in series with the power supply signal as shown in FIG. 2. Generally, the signal LoOn will provide a drive signal to enable transistor 84 to provide the power signal to the power output terminal 52. When it is desired to stop power going to the power output node 52, the signal LoOn will disable the transistor 84 and prevent the power from flowing to the output node 52. When transistor 84 is on, the voltage at nodes 46 and 52 will be nearly the same and the output of comparator 85 will be low. If transistor 84 is turned off, the voltage on node 46 will stay high, while the voltage on node 52 will drop and the output of comparator 85 will go high, providing a signal RECIR to the control logic 42.

As can also be seen in FIG. 3, the feedback resistor network 54 has the appropriate resistors coupled and a feedback node labeled VFBN is provided. This feedback node provides a signal to comparator 61 as also shown in FIG. 2, and the output on line 63 is provided to the control logic 42, also shown in FIG. 2.

FIG. 4 illustrates more details of the frequency-to-voltage conversion 56 as well as the peak current detection circuit 58. It also contains other components of the system as a whole shown in FIGS. 2 and 3 in order to provide a context for the connection of the various systems.

As can be seen in FIG. 4, the PWM signal 60 is provided to the buffer drive circuit 62 which drives the power transistor 63. It is also provided to the mirroring transistor 64, which mirrors the voltage at the ratio 1:k as shown in FIGS. 3 and 4. A current k is output from the mirror transistor 64, and a voltage signal $V_k$ is provided on this output node. As seen both FIGS. 4 and 3, this voltage $V_k$ is provided to the non-inverting input of the ilimit_OTA comparator 70 which outputs a signal on line 80 indicating whether or not the peak current limit has been reached. The value K of the mirroring current can be selected to be an acceptable value to mirror the power current. In one embodiment, K is chosen to be a relatively high value, such as 2,640. Other ratios can be chosen to achieve a desired mirroring current. The voltages shown in FIG. 4 for $V_k$ and $V_{SW}$ will be provided to the comparator 70.

Turning now to other portions of the circuit in FIG. 4, the variable frequency on line 60 is provided to filter 72 of the frequency-to-voltage conversion circuit 56, which in one embodiment is a divide-by-two filter. In this example, it is provided to a clocked D flip-flop 86 whose output is provided to a logic integrator having switch S2 and an OR gate 88. When the signal is high from the D flip-flop 86, switch S1 will close and switch S2 will open. As can be seen, there is an inverter 90 positioned between the output Q and the switch S2. Therefore, S1 and S2 will always operate in opposition to each other so that when one is closed, the other is open. A sampling pulse is provided by the sample circuit 91 which closes switch S4 to permit sampling of the signal being provided from the PWM supply line 60. In particular, when S1 is closed and both sides of C1 are shorted together, the voltage $V_x$ is forced towards ground. When $V_x$=ground, the output of op amp 92 is driven towards a low voltage. However, it is clamped in the clamping level shifting circuit 94 to prevent the output from going to zero and to prevent the signal provided on transistor 96 from going to zero. Transistor 96 is operated in the active region in the linear transistor range as an analog element. Accordingly, it can vary the amount of current passing through it in an analog fashion. Thus, with the transistor 96 operating in the linear transistor range, the voltage $V_y$ can vary and the current $I_{gm}$ is variable. When $V_x$=0, then the output of the op amp 92 is clamped such that the voltage $V_y$ is clamped to a selected voltage and bias current $I_{gm}$ equals a set value. In one embodiment, this bias current is selected to be 450 mA and the resistor R has a value of 22 kΩ. As can be appreciated, different values may be used in different circuit designs.

The circuit of FIG. 4 also contains a low frequency detect circuit and a minimum peak current voltage adjustment circuit. As can be seen in FIG. 4, an op amp 100 has as one input a Vadj signal on line 102. The Vadj is a voltage selected by an end user, the maker of the chip, or a customer, in order to customize the peak current that the system will permit. This permits a user to tune the system for a desired voltage and current operation range. The value selected for Vadj is the maximum voltage that will be permitted for $V_x$ during operation. This will therefore set a starting level for the permitted peak current. $V_y$ can therefore be set to be within a desired range and to not exceed Vadj when $V_x$=0. Accordingly, the following equations hold true for the circuit as shown in FIG. 4 during operation.

$$V_x = Vadj - gain*F \quad (Eq.\ 1)$$

where gain*F is the gain of the op amp 100.

$$Igm_F = V_x + V_{os}*gainGM \quad (Eq.\ 2)$$

$$I_K = Igm \quad (Eq.\ 3)$$

The current $I_K$ is shown in FIG. 4 as output from transistor 64, $V_{os}$ is the voltage boost by the circuit $V_{os}$ shown in FIG. 4, Igm is the bias current and gainGM is the gain of circuit 78, which is provided by op amp 92. (As can be appreciated, simple versions are shown for these circuits since op amp and their gain control are known in the art.)

Another input to the system is the low frequency detect signal on line 104 as shown in FIG. 4. This signal on line 104 is high when the switching period is greater than the selected value for the low frequency detect timer on line 105. In the embodiment shown, the selected value is 8 µs, although it could be different values depending on the system parameters. The low frequency detect on line 104 is high when the switching period is greater than a desired low frequency that is set on line 103 for the timer. The purpose of this signal is to turn of the switch S1 so that $V_x$ will be driven low when the frequency is very low. This will force the next turn on of the system to be set at a low current, above some minimum threshold, and accelerate the recovery to a higher frequency. When the output of the low frequency on line 104 is high, switch S3 will be closed and will discharge $V_x$ to ground. The signal LoOn is the logic signal from the recirculation period during part of the operation. The signal HiOn is the logic signal that turns on the high side as explained herein. The low frequency detect timer input signal on line 103 as shown in FIG. 4 is high when the distance between the pulses is greater than 8 µs. This will occur when the frequency on line 60 becomes lower than a desired value.

The signal will reset $V_x$ to ground and will therefore cause the current to always stay above a selected value even when there is very light load. In particular, the permitted peak current will become low when the load power demand is low. If the power drawn by the load were to go to zero for a long period of time, the permitted peak current would also go zero. If this were the case, when the load started to draw power it would take some time to readjust the permitted peak current to a higher value. The lower frequency detect timer on line 103 will trigger the circuit if the power goes to low to stop the further decline of the permitted peak current. When the selected threshold for the low frequency is reached, the peak current will be held at a threshold value and will not go further towards zero. This minimum peak current, as set in the clamp and level shifter circuit 94, will hold the peak current above a threshold value at all times, even at zero power drawn by the load 50.

The operation of the circuit of FIGS. 3 and 4 will now be described in more detail and examples shown in FIGS. 5, 6, and 7 of the signal value at different nodes in the circuit. As can be seen viewing the circuit, the power transistor 63 in conjunction with the sensing transistor 64 are used to detect the peak current. The sensing transistor 64 has a mirrored ratio of k from the current running through the power transistor 63. When the current $I_{gm}$ increases, as shown in FIG. 4, $I_K$ will also increase. $V_k$ will start to fall as $I_K$ increases. When the comparator 70 detects the $V_k$ is less than $V_{SW}$, it will output a signal on line 80 called ilimit_OTA. This will be provided as the output 80 of the peak current detect circuit 58 to the control logic 42 to reduce the amount of power which the system can output to the load 52 in order to keep the current lower than the maximum load current that has been set by the system. In addition, the system also has a current below which the peak current cannot fall. In particular, when the frequency becomes too low as detected by the low frequency detect line 104 which receives the low frequency timer detect input on line 103, the whole voltage $V_x$ will fall. The output voltage of the op amp 92 will be clamped to ensure that the voltage $V_y$ will be clamped at a certain threshold. This threshold will determine the minimum value to which the peak current of the device can fall. Namely, the peak current permitted may not fall to zero, thus, even when there is very light load conditions with very low to no power being provided, the permitted peak current will not fall to zero but will stay above a selected value labeled the "Light load current" in FIG. 5B. Thus, the minimum value to which the peak current may fall is based on the clamp voltage provided by the clamp circuit 94.

Using the method just described for controlling the control logic 42 that drives the power supply switch circuit 44, there is no need to sense the output voltage to determine the peak current that the system is experiencing and use that to limit the current. In the proposed system as shown in FIG. 2, the operating frequency that is output from the control logic 42 is used and will have a much faster response time for determining whether or not the system is about to exceed the peak current and, as appropriate, modify the value of the peak current so that as the load requirements are decreased, the permitted peak current is also decreased. Further, in this system, there is a tracking timer to reset the integrator. When the operating period is longer than the timer period on line 103, the hold capacitor is reset with the low frequency detect signal on line 104 based on the desired low frequency value. The use of the low frequency detect signal 103 will improve the output recovery to transition from a light load to a maximum load by ensuring that even under a light load, the peak current limit does not go to zero, but is set to a minimum value.

FIG. 5 has four signals shown thereon, 5(A), 5(B), 5(C), and 5(D). The signals 5(A)-5(B), are signals found in the circuit of FIGS. 3 and 4. The signal shown in FIGS. 5(C) and 5(D) are signals from the prior art system.

Figure 5A:
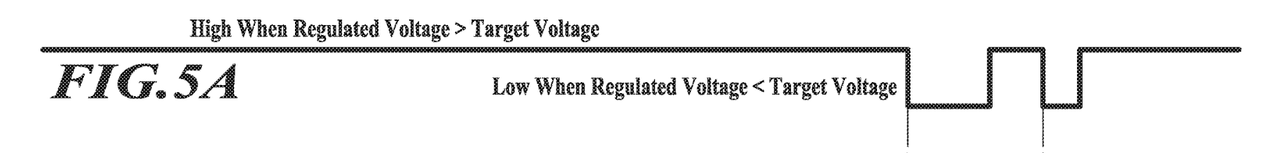
FIGS. 5A-5D show simulations of various waveforms in the circuits of the disclosed embodiments, as compared to waveforms in the circuits of the prior art.
Figure 5B:
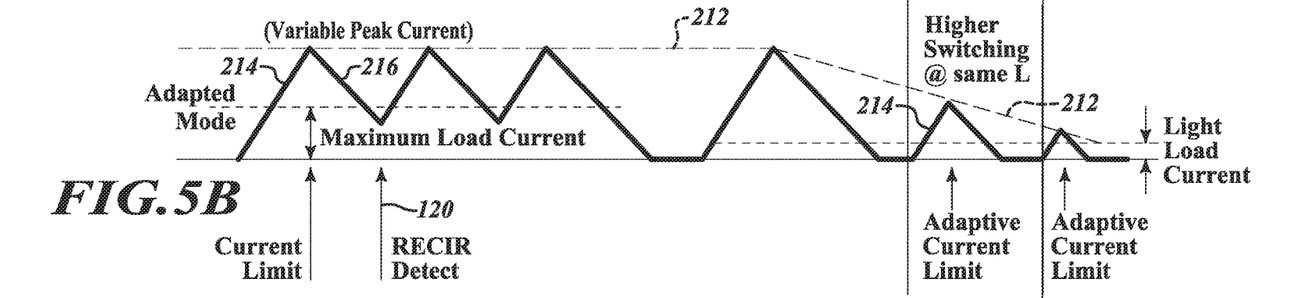
Figure 5C:
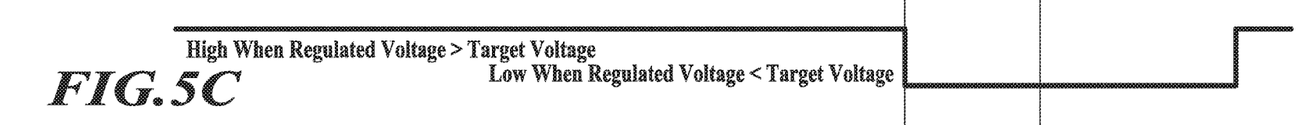
Figure 5D:
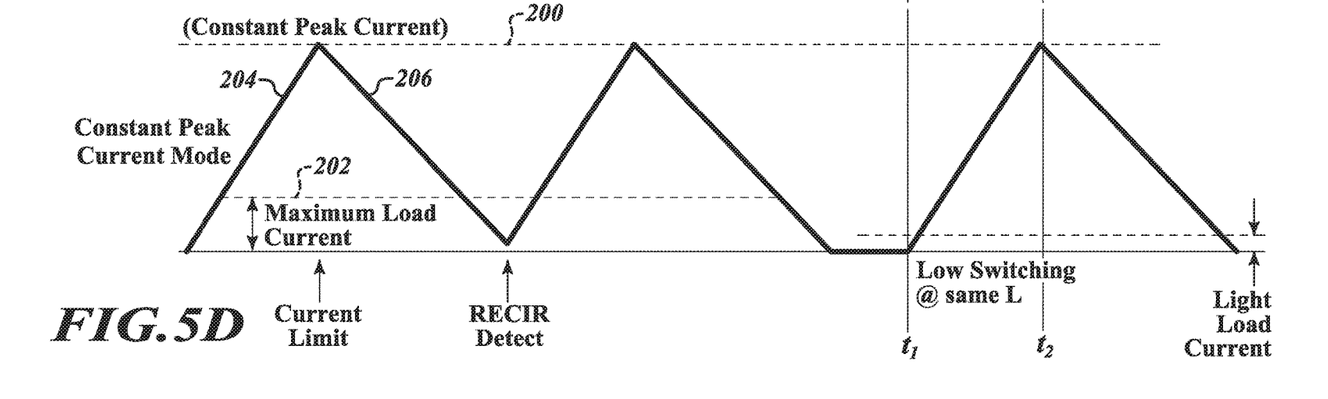

As shown in FIG. 5(D), the prior art has a peak current that is set as a constant peak current that will not change over the operation or the life of the circuit. In the example shown, this peak current illustrated by the line 200 is set at 2 amps. This is the current that the system cannot exceed at any time during its operation in order to protect downstream components from the current output switch 12. Shown in line 202 is the maximum load current drawn by load 20 of the prior art. As can be seen in FIG. 5, as the current drawn through the power transistor climbs on line 204, it will increase until it reaches the peak current that is permitted when it reaches line 200. At this point, the system of the prior art as shown in FIG. 1 will open the power supply switch 12 to stop providing power to the load 20. The current will therefore fall as shown in the falling slope 206. The current will decrease until it is below the maximum load current line 202 after which it will once again begin to increase until it reaches the constant peak current line 200 as shown by the repeated rising and falling in FIG. 5(D). Each time the provided current approaches the peak current, the various components in the system, such as the inductor and the transistors, will be subject to this high peak current of approximately 2 amps and will undergo additional stress, as well as heat loss, and power dissipation that is not provided to the load. Thus, additional overall power is drawn from the V supply as shown in FIG. 1. The current provided to the load itself, line 202, will be obtained from the power on lines 204 and 206, which reach peak current 200 many times. The peak current 200 is filtered through LC filter 14 to provide the current 202 at a more constant level.

When the power used by the load 20 goes low, as shown by the transition from high regulated voltage as the target voltage in FIG. 5C to the low level at time $t_1$ when a low regulated voltage is required, then only a light load current is drawn, as shown by the time between signals $t_1$ and $t_2$ in FIG. 5D. Thus, when a low regulated voltage is needed as shown in 5C, only a light current is being drawn by the load 20. However, as shown in the prior art, the peak current 200 remains at a constant peak current value, in this case 2 amps. Therefore, when the load 20 begins to draw a load, the signal 204 will climb until it reaches the peak current 200, and then, once sufficient current is provided as shown at time $T_2$, it will decline again on line 206 until it is below the desired current drawn by the load. Therefore, even though only a very small amount of power is being demanded by load 20, the peak current 200 remains at a constant value, and thus components that can always be subjected to this high peak current must be used in the circuit 12 and the circuit 14, as is carried out in the prior art.

In the event V supply is a battery, this will be an additional power drain on the battery. As continues to be shown in FIG. 5, at some point, the power demanded by the load will reduce so that only a very light load current is needed, as shown on the far right-hand side of FIG. 5(D). In this situation, the system of the prior art still has a peak current that is set at a constant value of 2 amps. Therefore, each time the system provides power to the load, even under light load conditions, the current will rise towards the peak value at which time it will turn off. The frequency at which the output from the switch transistor 12 will reach the peak current will be less because less power is demanded. However, it will still reach the peak current that was available to it even when high power is demanded.

The inventive circuit can be seen in the operation of FIGS. 5(A)-5(B) as the permitted peak current is variable, depending on the load demand for power. As can be seen in 5(A), the signal on line 23 will be high when the regulated voltage is less than the target voltage. Namely, when the output voltage on node 52 is lower than desired and the load 50 is consuming power, then additional power is provided to the system, as can be seen in FIG. 5(B). In the adaptive mode, the current rises at slope 214 to reach the variable peak current at line 212, in this example 1 amp, and then is gradually decreased as shown by line 216 when the control logic is shut off until it reaches the maximum load current of the adaptive mode, indicated by arrow 120 of FIG. 5(B). At this point, the RECIR signal from comparator 85 of FIG. 3 goes high and the provided current, and thus provided power, will rise again, until it reaches the variable peak current 212 as shown in FIG. 5(B). This pattern will repeat as needed to maintain the output voltage 52 at the desired value. When the power drawn by the load 50 is decreased, to be a light load current, as shown starting at time $t_1$, the permitted peak current will be reduced to a lower value, for example, to 0.5 amps. Therefore, there is a dynamic change of the maximum current that the system can output and the peak current is limited to a new value, in this example, approximately half of the previous peak load current. As can be seen in FIG. 5B, the current output by the voltage supply 67 will rise as shown on line 214 until it reaches the adaptive current limit 212 between times $t_1$ and $t_2$, which is now at lower current limit than was available when the load was drawing a large amount of power. The switching frequency of the signal 60 will remain relatively high, and sufficient current and power will be provided to the load 50 even though the current that can be reached is lower than when the overall power being drawn by the load 50 was high. If the power drawn by the load continues to be light, then the permitted value for the peak current will continue to reduce after time $t_2$ to a low value. However, as shown in FIG. 5(B), the current which is permitted as the maximum peak current will stay above some minimum value labeled the light load current. Thus, even if the power drawn by the load is zero, the variable peak current system as disclosed herein will maintain a permitted peak current at some minimum value. This value can be set by the user or the system designer at the low frequency detect signal 103 based on the minimum frequency at which the system will clamp that the peak current to not fall below some selected threshold value. Thus, when the power drawn by the load 50 is zero or nearly zero, the peak current that will be permitted may be set at a light load current level. This may occur if the load 50 is a microprocessor which is in a hibernation mode, or a disk drive system in which the disk drive is in the off position for a temporary basis. The peak current, rather than going to zero after time $t_2$, as shown in FIG. 5B, will approach a light load current where it would be maintained at a threshold value. In the event the load 50 begins to draw more current, the dynamic peak current circuit as explained in FIGS. 2-4 will increase the permitted peak current to a high level once again so that sufficient current can be provided to the load. Thus, the variable peak current system as disclosed herein is an adapted mode which dynamically changes the permitted peak current depending on the amount of power which is drawn by the load.

Figure 6:
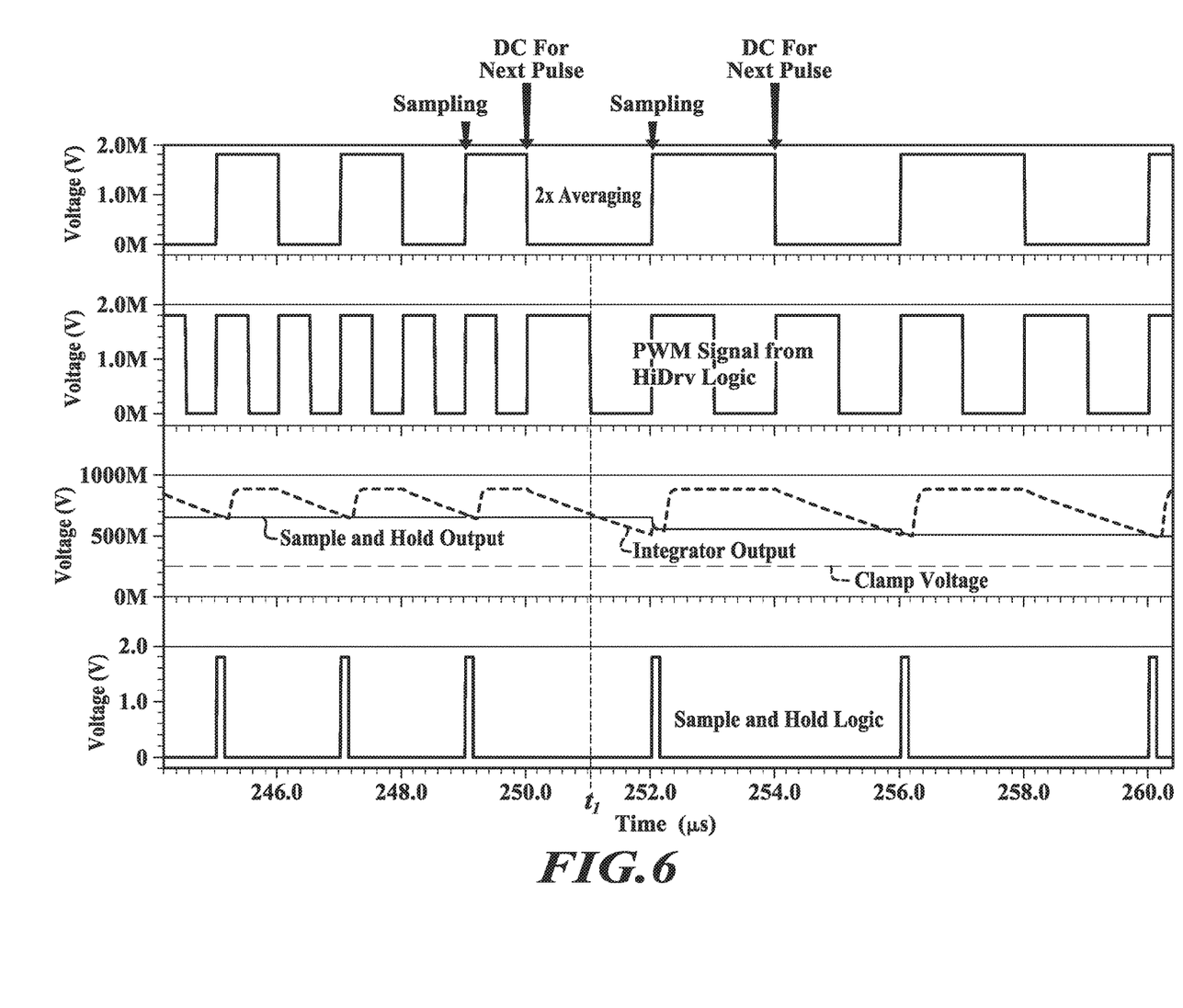
FIG. 6 illustrates a simulation of various waveforms according to the embodiments as disclosed herein.

FIG. 6 illustrates the voltages at different nodes in the circuit shown in FIGS. 3 and 4. The top line of FIG. 6 is the output queue of the 2× averaging flip-flop 86 as shown in FIG. 4. As can be seen, this provides a high signal to start the sampling and then a drop to a low signal in order to sample for the next pulse.

The second signal shown in FIG. 6 is the DWM control voltage V provided on line 60 from the control logic to the power supply switch circuit 44. This is a PWM signal output by the control logic 42. As can be seen, when high power is provided, the signal has a high frequency. However, as can be shown at time $t_1$, the frequency will decrease when less power is being drawn by the load. In this instance, the time $t_1$ of FIG. 6 corresponds to the time $t_1$ of FIGS. 5A and 5B. Namely, at time $t_1$ the load 50 is drawing substantially less power, and FIG. 6 along with 5A and 5B show how the circuit responds when the power drawn by the load is reduced, indicated as starting at time $t_1$.

The third voltage signal in FIG. 6 is the output of the sampling hold circuit and the integrator output circuit. The integrator output is the dashed line and the sample and hold output is a solid line. As can be seen, the integrated output rises to a selected value and then will decrease, as switches S1 and S2 are alternatively opened and closed. The sample and hold circuit output as represented by voltage $V_x$ shown in FIG. 4 and held by capacitor C2 will stay at a selected level while the frequency is high prior to time $t_1$. However, as the power drawn continues to decrease and the frequency output by the control logic 42 goes down, the voltage at the sample node output will decrease in a step function. It will continue to decrease until the power drawn is below a selected value. A line is shown as the clamp voltage as labeled in FIG. 6 below which the voltage $V_y$ will not fall. In particular, as the frequency decreases because less power is drawn by the load, the voltage level of the sample and hold output circuit will decrease. As the frequency continues to decrease, the voltage $V_x$ output by the sample and hold circuit will gradually decrease until it drops below the voltage shown as the clamp voltage in FIG. 6. Once the voltage $V_x$ drops below the clamp voltage, the clamp and level shifter circuit 94 will hold the gate signal on transistor 96 to a set value to maintain $V_y$ at the clamp voltage. Thus, if the sample and hold output goes below the clamp voltage line, then $V_y$ will be held equal to the clamp voltage shown in FIG. 6.

The graph on FIG. 6 does not show the time at $t_2$ in which the load has gone so low that the sample and hold output falls below the clamp voltage. However, as previously explained, once the power drawn by the load goes very low, the decrease in the dynamic peak current will end and the value of the peak current will be set at some minimum threshold value. This threshold value will correspond to the clamp voltage as shown in the third voltage segment of FIG. 6 as labeled by the dashed line clamp voltage. The bottommost graph in FIG. 6 shows the sample and hold circuit output of FIG. 4.

Figure 7:
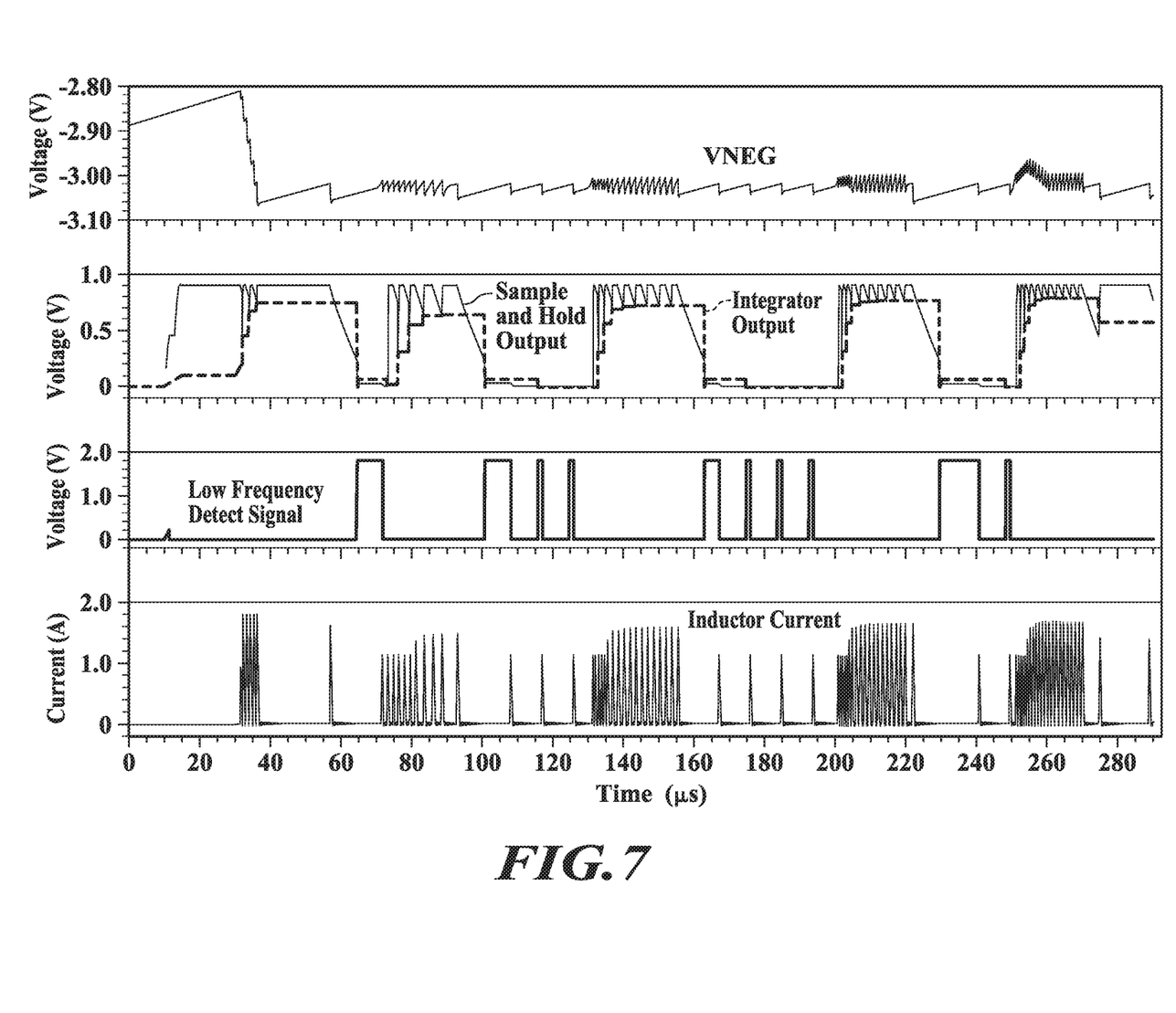
FIG. 7 illustrates simulations of sample waveforms of the circuit at various nodes in the circuit of FIG. 4 according to the principles as discussed herein.

FIG. 7 illustrates a simulation of the system operating with the low frequency detect signal. The uppermost voltage line shown in FIG. 7 is the V negative voltage output that is provided to the system on node 52. In the example shown, the V negative voltage is preferably held to approximately −3.0 volts. As previously stated, the voltage which is provided through the system can either be a positive power supply or a negative power supply voltage. In the example shown, the voltage at node 67 is a negative power supply voltage and therefore, the voltage which is output to the load is shown as a negative voltage. In other embodiments, it may be a positive voltage and the circuit will operate on similar principles as disclosed herein with correspondingly different components.

As can be seen in FIG. 7, the negative voltage is preferably set at approximately −3.0 volts. The negative voltage is held with fairly tight tolerance to a thinness level in this simulation, fluctuating slightly between −3.0 volts and −3.04 volts.

The output of the sampling hold circuit is shown at a different time scale from FIG. 6. Namely, the graph as shown in FIG. 6 shows the time period in microseconds from the time of 240 microseconds to 260 microseconds, the entire time period shown in FIG. 6 being 40 microseconds. On the other hand, in the simulation of FIG. 7, a much longer time period is shown, from zero microseconds to 280 microseconds. Therefore, the time scale on FIG. 7 is substantially longer than the time scale shown in FIG. 6. (As will be appreciated, the graphs shown in FIGS. 6 and 7 are of different simulations and FIG. 6 is not a subset of the graph of FIG. 7.)

As also shown in FIG. 7, the low frequency detect signal goes high whenever the output drawn by the load falls below a certain value so that the PWN signal output on line 60 is below a selected frequency. When the low frequency detect signal goes high as shown in FIG. 7, then the output of the sample in which the circuit is clamped to a selected value and cannot fall below that value. This will keep the peak current above a minimum threshold voltage. In the embodiment shown, the value at which the low frequency detect signal is triggered is at 8 μs, though it could be other values. Therefore, as can be seen in FIG. 7, if more than 8 μs passes and the low frequency detect timer 103 has not gone high, then the system will increase to a new current level and will adaptively change to a higher permitted peak current. On the other hand, if the frequency is sufficiently low that before 8 μs has passed, the low frequency detect signal 103 is triggered, then the permitted peak current will be maintained at a low value, as can be seen viewing FIG. 5.

The bottom graph of FIG. 7 illustrates the inductor current that the inductor of the filter circuit 48 will experience.

Figure 8:
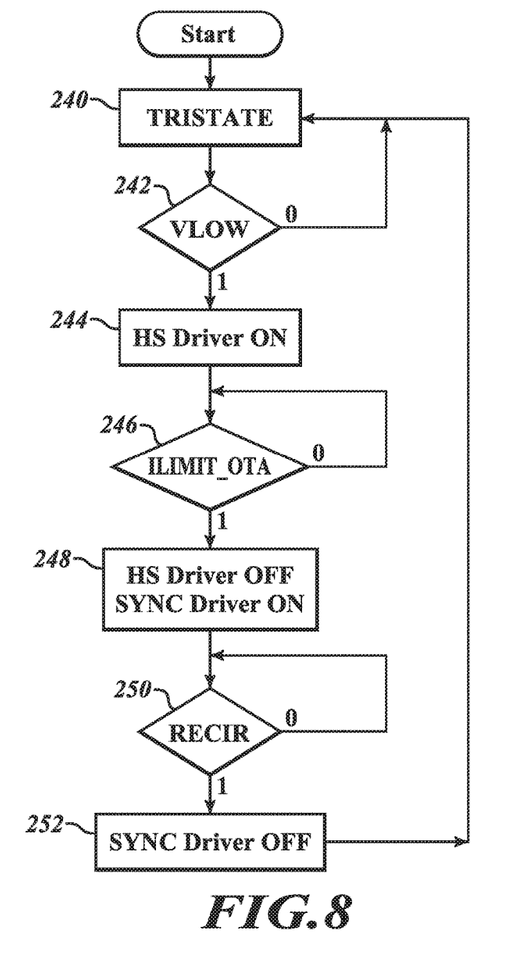
FIG. 8 is a control state diagram of the circuit of the various embodiments as disclosed herein.

FIG. 8 illustrates the control state diagram for the adaptive current limit control circuit. When the system starts, the output is put in a tristate as shown by start block 240. After the system starts, the state diagram advances to block 242 which queries whether the voltage is to remain low or the voltage is to transition to high. If the voltage is to remain low then it returns to the start 240 and maintains a loop until the voltage is indicated as going high. Once the voltage is indicated to going high, then it turns on the HS driver in step 244. When the high side driver is on as shown in step 244, the system checks for the peak current ILIMIT_OTA to be reached in step 246. If the peak current ILIMIT_OTA is not reached, then the feedback returns to step 246 to continue to ask whether or not the peak current has been reached. According to the inventive system, the current can be limited by one of two methods. The top current can be reached if it exceeds a preset ilimit peak value ILIMIT_Pk of FIG. 3. Or if it reaches an ILIMIT_OTA as the dynamic, adaptive peak current value. As can be seen in FIG. 3, the ILIMIT_Pk peak is a first value. This is a set value which does not change for the life of the circuit. The adaptive value, shown as ILIMIT_OTA, output from comparator 70 is a separate current limiter and a separate comparator with a separate sense system than in the adaptive peak current. The adaptive maximum peak current limit will dynamically change to a lower or higher value. However, as has been explained herein, the ILIMIT-OTA is a dynamically changing maximum current that is permitted. When the power drawn by the load is low, then the current that is permitted as the maximum peak current is reduced so that the peak current shutoff is reached sooner, at a lower current level. Thus, when only a low power is drawn from a load, then the peak current will be at a lower value and this will be triggered sooner than the maximum permitted peak current which is sensed at op amp 68 of FIG. 3.

Once the peak current is triggered in block 246 of ILIMIT-OTA, then the state diagram advances to block 248 in which the high side driver is turned off and the synch driver is turned on. This is illustrated in FIG. 6 by turning on the synch driver 48 by driving transistor 84 on and thus entering the recirculation state 250. The recirculation state 250 senses whether or not the power provided to the load 50 has dropped below an acceptable value. This is the signal output by comparator 85 in FIG. 3. Once the power drops below an acceptable value, then the recirculation mode 250 exits the recirculation stage and the output of the recirculation comparator goes high and the synch driver is turned off in step 252. In this state, the transistor 84 is turned on to once again connect V node 46 to node 52 as illustrated in FIG. 3. The system then returns to the start in step 240 and, if the circuit remains in operation, advances to state 242 to continue to repeat and operating the system.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
controlling timing on an on/off state of a switch circuit using a variable frequency control signal;
supplying power at a first value to a load through the switch circuit based on the timing of the on/off state of the switch circuit;
detecting a frequency value of the variable frequency control signal;
comparing a signal corresponding to the frequency value of the variable frequency control signal that controls the on/off state of the switch circuit with a reference signal value;
adjusting the frequency value of the variable frequency control signal to become an adjusted frequency value based on a result of the comparing with the reference signal value; and
supplying power at a second value to the load through the switch circuit based on adjusted timing of the on/off state of the switch circuit controlled using the adjusted frequency value of the variable frequency control signal.

2. The method of claim 1, wherein the signal corresponding to the frequency value is a current signal associated to a voltage signal converted from the frequency value.

3. The method of claim 1, wherein the signal corresponding to the frequency value is a voltage signal that is converted from the frequency value.

4. The method of claim 1, wherein the adjusting the frequency value of the variable frequency control signal further includes clamping the frequency value of the variable frequency control signal to a threshold value.

5. The method of claim 4, further comprising stabilizing the threshold value, the stabilizing preventing the threshold value from going below a selected value.

6. The method of claim 1, wherein the comparing the signal corresponding to the frequency value of the variable frequency control signal with the reference signal value includes adjusting the reference signal value.

7. A method, comprising:
coupling a load to a power supply through a switch circuit, the switch circuit configured to switch based on a control signal having a frequency;
detecting a first value of a power provided to the load through the switch circuit;
comparing the first value of the power with a reference power;
adjusting the frequency of the control signal to become an adjusted frequency based on the comparing the first value of the power with the reference power; and
supplying the power with a second value to the load based on the adjusted frequency of the control signal.

8. The method of claim 7, wherein the adjusting the frequency of the control signal including:
detecting the frequency of the control signal;
converting the frequency into a voltage signal;
comparing the voltage signal to a reference voltage; and
adjusting the reference voltage based on the comparing the first value of the power with the reference power.

9. The method of claim 8, wherein the adjusting the reference voltage includes:
reducing the reference voltage if the first value of the power is smaller than a first reference value of the reference power; and
increasing the reference voltage if the first value of the power is larger than a second reference value of the reference power.

10. The method of claim 8, further comprising:
stabilizing the reference voltage using a stabilization circuit that includes a sample and hold circuit.

11. A circuit, comprising:
a switch circuit coupled between a load and a power supply;
a control unit that provides a control signal to the switch circuit, the control signal having a frequency component;
a frequency sensing unit that detects the frequency component of the control signal and converts the frequency component to a voltage signal; and
a feedback circuit that adjusts the frequency component of the control signal to become an adjusted frequency component based on comparing the voltage signal to a reference voltage value and supplies the adjusted frequency component of the control signal to the control unit for the control unit to provide an adjusted control signal to the switch circuit.

12. The circuit of claim 11, wherein the switch circuit is part of a power regulation circuit coupled between the load and the power supply.

13. The circuit of claim 12, wherein an output power of the power regulation circuit varies with the frequency component of the control signal.

14. The circuit of claim 13, further comprising a load feedback unit coupled to detect the output power of the power regulation circuit.

15. The circuit of claim 14, wherein the load feedback circuit provides a feedback signal to the control unit based on the output power.

16. The circuit of claim 14, wherein the load feedback unit includes a voltage divider.

17. The circuit of claim 14, wherein the load feedback unit includes a comparator that compares the output power with a reference power value.

18. The circuit of claim 11, wherein the frequency sensing unit includes a mirroring transistor.

19. The circuit of claim 11, wherein the feedback circuit is configured to compare the voltage signal with a reference voltage to generate a signal to the control unit.

20. The circuit of claim 11, wherein the control unit includes a power termination circuit which outputs a termination signal to turn off the switch circuit when the voltage signal meets a threshold value.

* * * * *